US012502347B2

(12) United States Patent
Shaffer et al.

(10) Patent No.: US 12,502,347 B2
(45) Date of Patent: Dec. 23, 2025

(54) RETINOL FORMULATIONS AND SKIN TREATMENT METHODS THEREOF

(71) Applicant: Topix Pharmaceuticals, Inc., North Amityville, NY (US)

(72) Inventors: Burt R. Shaffer, North Amityville, NY (US); Steven M. Hernandez, North Amityville, NY (US)

(73) Assignee: Topix Pharmaceuticals, Inc., North Amityville, NY (US)

( * ) Notice: Subject to any disclaimer, the term of this patent is extended or adjusted under 35 U.S.C. 154(b) by 312 days.

(21) Appl. No.: 17/286,084

(22) PCT Filed: Oct. 18, 2019

(86) PCT No.: PCT/US2019/057010
§ 371 (c)(1),
(2) Date: Apr. 16, 2021

(87) PCT Pub. No.: WO2020/081983
PCT Pub. Date: Apr. 23, 2020

(65) Prior Publication Data
US 2021/0369586 A1    Dec. 2, 2021

Related U.S. Application Data

(60) Provisional application No. 62/747,927, filed on Oct. 19, 2018.

(51) Int. Cl.
| | |
|---|---|
| *A61K 8/67* | (2006.01) |
| *A61K 8/34* | (2006.01) |
| *A61K 8/86* | (2006.01) |
| *A61K 8/9789* | (2017.01) |
| *A61K 9/00* | (2006.01) |
| *A61K 9/06* | (2006.01) |
| *A61K 31/07* | (2006.01) |
| *A61K 36/82* | (2006.01) |
| *A61K 47/10* | (2017.01) |
| *A61K 47/34* | (2017.01) |
| *A61Q 19/08* | (2006.01) |

(52) U.S. Cl.
CPC .............. *A61K 8/671* (2013.01); *A61K 8/347* (2013.01); *A61K 8/86* (2013.01); *A61K 8/9789* (2017.08); *A61K 9/0014* (2013.01); *A61K 9/06* (2013.01); *A61K 31/07* (2013.01); *A61K 36/82* (2013.01); *A61K 47/10* (2013.01); *A61K 47/34* (2013.01); *A61Q 19/08* (2013.01); *A61K 2800/28* (2013.01); *A61K 2800/522* (2013.01); *A61K 2800/591* (2013.01)

(58) Field of Classification Search
CPC ...... A61K 8/671; A61K 8/347; A61K 8/9789; A61K 9/0014; A61K 31/07; A61K 36/82; A61K 47/10; A61K 2800/28; A61K 2800/522; A61K 2800/591; A61Q 19/08
See application file for complete search history.

(56) References Cited

U.S. PATENT DOCUMENTS

| | | | |
|---|---|---|---|
| 9,144,434 B1 * | 9/2015 | Rodan ..................... | A61K 8/585 |
| 2007/0065396 A1 | 3/2007 | Morariu et al. | |
| 2010/0247693 A1 * | 9/2010 | Marini .................... | A61Q 19/00 424/769 |
| 2011/0142769 A1 * | 6/2011 | Kulesza ................. | A61Q 19/00 424/59 |
| 2018/0243196 A1 * | 8/2018 | Shaffer .................. | A61K 47/10 |
| 2019/0099340 A1 * | 4/2019 | Fields ...................... | A61K 8/24 |

FOREIGN PATENT DOCUMENTS

| | | |
|---|---|---|
| WO | 2012094638 A1 | 7/2012 |
| WO | WO-2017011600 A1 * | 1/2017 ............. A61C 19/00 |

OTHER PUBLICATIONS

CIR Review (Safety Assessment of Camelia Sinensis-derived Ingredients as Used in Cosmetics, Cosmetic Ingredient Review, 2014) (Year: 2014).*
Google Patents translation of KR102541330B1, published Jan. 9, 2018 (Year: 2018).*
International Search Report for PCT/US2019/057010 mailed Feb. 6, 2020, 2 pages.
International Preliminary Report on Patentability for PCT/US2019/057010 mailed Apr. 29, 2021, 7 pages.
Begoun P., "Don't Go to the Cosmetics Counter Without Me," New World Press, 8th Edition, Dec. 2009, p. 261.
Office Action for Chinese Patent Application No. 201980079693.9, mailed Oct. 27, 2022, 11 Pages.

* cited by examiner

*Primary Examiner* — Robert A Wax
*Assistant Examiner* — John Seungjai Kwon
(74) *Attorney, Agent, or Firm* — Lowenstein Sandler LLP

(57) ABSTRACT

Disclosed are stable, non-irritating, retinoid containing formulations for topical application to the skin for modulated sheet-peeling of the skin without inflammatory response that retards healing of the skin. The topical formulations have concentration levels of ingredients, including retinol, a retinol activation system having a surfactant and a solvent, anti-inflammatory agents, that are formulated for exfoliating skin in skincare treatments such as chemexfoliation, peeling, dermal restructuring, without associated inflammatory affects, such as irritation, redness, drying, oozing, swelling, tenderness of skin, which retard healing of the skin. Also provided are methods for the formulation, manufacture and use of the disclosed formulations.

14 Claims, No Drawings

RETINOL FORMULATIONS AND SKIN TREATMENT METHODS THEREOF

CROSS-REFERENCE TO EARLIER APPLICATIONS

This application claims priority under 35 U.S.C. § 119(e) to U.S. Provisional Patent Application Ser. No. 62/747,927, filed Oct. 19, 2018, the entire contents of which are incorporated herein by reference.

FIELD

The present invention relates to the field of retinoid formulations, including retinol compositions, having active ingredients that are formulated for topical application to the skin in skincare treatments for modulated exfoliation of skin, such as chemexfoliation, peeling, dermal restructuring, without typical inflammatory response, as well as to methods for their formulation, manufacture and use thereof.

BACKGROUND

Retinoids are useful in the treatment of various and diverse dermatological conditions, including inflammatory disorders, conditions characterized by increased cell turnover, such as psoriasis, photoaging, age spots, skin wrinkles, acne, and skin cancers, as well as in ongoing treatments to reduce the severity and number of lines and wrinkles of the skin.

Retinoids, such as retinol, can also be irritating to the skin, discouraging continued application, or periodic treatments, of the skin by those in need of treatment with retinol-containing formulations, and thereby reducing, if not eliminating, efficacy of the treatment.

Available retinoid formulations, including those with retinol, include solvent-based systems, ointments, water-based formulations, emulsions, gels, foams, suspensions, serums, and lotions, all of which vary in their stability and their efficiency. Retinoids, and, in particular, retinol, are notoriously unstable and easily oxidized in the presence of air, as well as in the presence of ingredients commonly used in cosmetic formulations. This can be a serious issue when applied as a thin layer to a relatively large surface area of the skin.

In particular, prior formulations having retinol that are formulated for specialized skincare treatments, such as chemexfoliation, peeling, dermal restructuring, which are done in physician or aestheticians offices under their supervision, are not effective in their intended use. For example, such prior retinoid/retinol-containing formulations often cause problems, such as intense irritation, itching, oozing, crusting, scaliness and drying, due to the concentrations of the active agents, i.e., irritancy, of the formulations. Such formulations also are not effective in exfoliating skin because the results are micro-peeling, i.e., skin is peeled in small particles similar to powder, and not sheet-peeling so that skin is peeled in larger, sheet-like particles. Intense, sheet-like skin peeling typically requires powerful exfoliating compositions, which may require treatment under close medical supervision, such as in a hospital, and treatment with other topical active agents, such as steroids.

Accordingly, there is a need in the art for topical formulations that can provide retinoids, such as retinol, to the skin of those having skincare treatments noted above for intense, sheet-peeling of skin, without associated irritation, redness, oozing, swelling, tenderness, over-drying of the person's skin.

The present disclosure provides new, improved formulations for retinoids, such as retinol, that are useful in chemexfoliation, peeling, dermal restructuring, among other dermatological procedures, for modulated peeling of skin without associated irritation, redness, oozing, swelling, and drying/tenderness of the skin. These treatments are effective alone, as a series of treatments and/or accompanied by lower strength continued home regimens.

SUMMARY

The present disclosure provides retinoid formulations for skin treatment procedures, and more particularly, retinol formulations. The disclosed formulations exhibit product stability, low irritancy, and improved efficiency in dermatological procedures, such as chemexfoliation, peeling, and dermal restructuring, which require intense, and often sheet peeling of skin. In particular, the present disclosure provides one or more retinol formulations, which provide enhanced penetration of the retinol active agent into the skin thereby providing improved results in dermatological procedures, such as chemexfoliation, peeling, antiaging procedures, to improve the tone and/or texture of the skin and dermal restructuring, without inflammatory response that retards healing of the skin.

In one aspect of this disclosure the skin is human skin. In other aspects of the present disclosure, the skin is that of a companion animal, a domestic animal, or a commercially useful animal.

The disclosed formulations comprise at least one retinoid source. In one aspect of this embodiment, the retinoid may be retinol, retinaldehyde, an ester of retinol, including e.g., palmitate and stearate esters of retinol, retinoic acid, or a synthetic retinoid, such as adapalene, bexarotene, tazarotene, or a combination of two or more, or derivatives thereof. In one aspect of this embodiment, the retinoid is retinol. In another aspect the retinoid is all trans-retinol.

The inventors have recognized that when a retinoid source is combined with a suitable activation system, selected and formulated for the retinoid active agent, unexpected and surprising results are obtained in exfoliating skin in sheet-like pieces without inflammatory response that retards healing of the skin. Activation systems disclosed herein have a surfactant component and a solvent component in varying percentages. Inventors believe, without wishing to be held to that belief, that the surfactant component, for example, a non-ionic surfactant, couples with the retinoid in a retinoid-surfactant complex having polarity, which combines with the solvent component, for example, a polar solvent, resulting in an effective system for driving retinoid into the skin.

In aspects of the present disclosure, a topical formulation for skincare treatments has a retinoid, a retinoid activation system comprising a surfactant and a solvent, and an anti-inflammatory agent. In % w/w, the retinoid is at least 2%, the retinoid activation system has at least 2% of a surfactant and at least 10% of a solvent and the anti-inflammatory agent is at least 0.1%.

In aspects herein, the retinoid is all trans-retinol, the solvent is ethoxydiglycol, the surfactant is polysorbate 20, and the anti-inflammatory agent comprises one or more antioxidant.

In further aspects of the present disclosure, a method of skin treatment for modulated exfoliation of skin without inflammatory response comprises applying to a skin area an effective amount of a formulation having a retinoid, a retinoid activation system having a surfactant and a solvent, and an anti-inflammatory agent, wherein (% w/w) the retinoid is at least 2%, the retinoid activation system comprises at least 2% of a surfactant and at least 10% of a solvent, the anti-inflammatory agent is at least 0.1%, and the skin is exfoliated in sheet-peeling without inflammatory response that retards healing.

In one aspect of this embodiment, the solvent is ethoxydiglycol.

In one aspect of this embodiment, the surfactant is a non-ionic surfactant. In one specific aspect of this embodiment, the surfactant is polysorbate 20.

The disclosed formulations may also comprise one or more antioxidants. In one aspect of this embodiment, the antioxidant is a polyphenol. In a more specific aspect of this embodiment, the antioxidant comprises a polyphenol isolate of *Camellia sinensis*. In a further aspect, the polyphenol isolate is a 90% leaf extract of *Camellia sinensis*. In other aspects of the present disclosure, resveratrol 85-99% is included in the disclosed formulations as an antioxidant.

In further aspects of the present disclosure, a topical formulation for skincare treatments includes a retinoid and a retinoid activation system, wherein (% w/w) the retinoid is at least 2% and the retinoid activation system is at least 0.1%.

In yet further embodiments of the present disclosure, the disclosed formulations include one or more antioxidants, wherein the antioxidants include at least 0.01% of *Camellia sinensis* polyphenols and at least 0.01% of resveratrol.

In yet further embodiments of the present disclosure, the disclosed formulations include (% w/w) 2%-98% retinoid activation system; 0.1%-20% *Camellia sinensis* green tea polyphenols; 2%-50% retinol; 0.1%-10% resveratrol. In yet further embodiments of the present disclosure, the *Camellia sinensis* green tea polyphenols is a 90% pure preparation and the retinol is all trans-retinol. In yet further embodiments of the present disclosure, the all trans-retinol is at least 90% pure all trans-retinol. In yet further embodiments of the present disclosure, the all trans-retinol is at least 95% pure all trans-retinol.

In yet further embodiments of the present disclosure, the disclosed formulations include (% w/w) 84.17% ethoxydiglycol; 2.00% *Camellia sinensis* green tea polyphenols; 6.0% retinol; 0.50% resveratrol; 7.33% polysorbate 20.

DETAILED DESCRIPTION

The present disclosure provides retinoid formulations and methods of use thereof for use in dermatological procedures, such as chemexfoliation, peeling, dermal restructuring, for alleviation or amelioration of dermatological conditions amenable to treatment with retinoids, including retinol. Amenable conditions include, without limitation, inflammatory disorders of the skin and skin conditions characterized by increased cell turnover including psoriasis, photoaging, weather-beaten appearance, yellowing, loss of elasticity, loss of collagen rich appearance and/or youthfulness, redness, dryness, age spots, skin wrinkles, acne, rosacea, melasma, ichthyosis, as well as skin cancers. The disclosed retinoid formulations are also useful for improvement in one or more aesthetic criteria, including, but not limited to, a perceived improvement in apparent skin age, skin tone, weather-beaten appearance, yellowing, loss of elasticity, redness, dryness, age spots, skin wrinkles, skin smoothness, brightness, radiance, as well as skin pores becoming less noticeable.

As used herein, the terms "treatment" or "treating" with respect to a skin condition generally mean "having positive effect on a skin condition" and encompass reduction, amelioration, and/or alleviation of at least one symptom of a skin condition, a reduction, amelioration, and/or alleviation in the severity of the skin conditions, or delay, prevention, or inhibition of the progression of the skin condition. Treatment, as used herein, therefore does not require total curing of the condition. A formulation of the present disclosure that is useful for treatment of a skin condition, or a method of treating a skin condition, need only reduce the severity of a skin condition, reduce the severity of symptoms associated therewith, provide improvement to a patient's quality of life, or delay, prevent, or inhibit the onset of one or more symptoms of a skin condition. As used herein, these terms also encompass aesthetic improvements to the skin upon application of the disclosed retinoid containing formulations and delivery systems.

As used herein, the terms "application," "apply," and "applying" with respect to a disclosed topical retinoid formulation, or method of using a disclosed topical retinoid formulation, refer to any manner of administering a topical retinoid formulation to the skin of a patient which, in medical or cosmetology practice, delivers the retinoid formulation to the patient's skin surface. Smearing, rubbing, spreading, spraying a disclosed topical retinoid formulation, with or without the aid of suitable devices, on a patient's skin are all included within the scope of the term "application," as used herein. The term "topical" or "topically" with respect to administration or application of a disclosed retinoid formulation refers to epicutaneous administration or application onto skin, and all common definitions of the term "application" in the context of skin treatments, both medical or cosmetic.

As used herein, the phrase "effective amount" refers to an amount of a retinoid formulation, or component thereof, effective to treat a skin condition as noted above, including a range of effects, from a detectable local improvement in an area of topical application to substantial relief of symptoms to an improvement in one or more aesthetic criteria, including, but not limited to, a perceived improvement in apparent skin age, radiation damage, sun or UV damage, skin tone, weather-beaten appearance, yellowing, loss of elasticity, redness, dryness, age spots, skin wrinkles, skin smoothness, brightness, radiance, as well as skin pores becoming less noticeable. The effective amount will vary with the particular condition or conditions being treated, the severity of the condition, the duration of the treatment, the specific components of the composition being used, and other factors. The disclosed compositions, formulations, and methods of use thereof reduce, minimize, or eliminate normally-observed retinoid-induced dermatoses including, inter alia, itching, breakdown of the skin barrier, discomfort, extreme dryness, cracking of the skin, oozing, crusting, scaliness and sensitization. The disclosed compositions, formulations, and methods of use thereof also provide aesthetic improvements in the skin, including but not limited to skin that appears younger, skin exhibiting a more even tone, skin in which the pores are less noticeable, and skin that is judged by the user to be smoother, and/or to be improved with respect to its weather-beaten or aged appearance, yellowing, loss of elasticity, redness, dryness, age spots, and/or skin wrinkles, and general tone and/or textural improvements.

As used herein, the term "exfoliation" refers to removing, i.e., peeling, the epidermis layer in sheet-like pieces. Exfoliation includes physical exfoliation, such as scraping or brushing off the skin, thermal exfoliation, and chemexfoliation using formulations, such as disclosed herein. Modulated peeling disclosed herein causes controlled damage to skin such that a healing response is induced so that the skin is repaired and restored in an accelerated manner without inducing undesirable and counter-productive damage and processes in the skin. In this, the exfoliation is "modulated" so that inflammatory response that retards healing is not produced, but rather beneficial information for skin repair and restoration. Inventors recognized that combinations of anti-oxidants disclosed herein with retinoid activation systems provide aggressive, intense exfoliation with controlled skin sheet-peeling and repair without excessive inflammation that prevents skin healing.

The aforementioned unexpected and surprising results have been reported to the inventors by others using the present formulations and methods in clinical settings with human subjects.

The retinoid activation systems disclosed herein, in particular, the ethoxylated ingredients disclosed herein, not only maintain product stability, including stability of the formulated retinoid as well as the antioxidant, but also provide a greater efficiency of the active agent retinoid.

The antioxidant can be a polyphenol that is isolated from plants, chemically synthesized, the antioxidant can also be a semi-synthetic compound prepared by modification of a natural polyphenol or mixture of polyphenols. In specific embodiments of the present disclosure, the antioxidant includes "green tea polyphenols" isolated and purified from the leaves of *Camellia sinensis* plants. These antioxidants, as formulated and delivered herein, provide antioxidant activity as well as anti-inflammatory activity, and, further, provide skin soothing, protection, and repair activity, and improve patient compliance and experience by reducing the irritation of, for example, the retinol and retinol activation system.

The present disclosure provides formulations comprising one or more retinoids, including retinol, that are useful in the disclosed treatment systems. The disclosed formulations provide retinoid stability, low irritancy, and efficient release of the active agent retinoid/retinol, when applied to the skin. In one aspect of this disclosure the skin is human skin. In other aspects of the present disclosure, the skin is that of a companion animal, a domestic animal, or a commercially useful animal.

In particular embodiments, formulations of the present disclosure comprise (% w/w) 0.5% to 98% retinol. In various aspects of these embodiments, formulations of the present disclosure comprise (% w/w) 0.50% to 50.0% retinol, 2% to 50% retinol, >1% to 75% retinol, >1.0 to 35% retinol, >2 to 25% retinol, 2% to 15% retinol, 2% to 10% retinol, >1% to 6% retinol, 2% to 6% retinol, 3% to 7% retinol, or 3% to 10% retinol. Such formulations can be, for example, those used in products for treatments provided by physicians and/or aestheticians in in-office procedures.

In specific aspects of these embodiments, formulations of the present disclosure comprise >1%, 2%, 6%, 10%, 15%, or 20% retinol.

Inventors believe, without wishing to be held to that belief, that the increased efficiency of delivery of the active agent retinoid, coupled with marked reduction in irritation observed upon administration of the presently disclosed retinoid formulations, permit the formulation and use of retinoid compositions with significantly higher concentrations of retinoid than previously employed.

Inventors believe, without wishing to be held to that belief, that the retinoid, retinol, and/or all trans-retinol of the presently disclosed formulations contribute to an increase in skin cell turnover, support collagen, elastin, skin matrix protein production in the skin, and brighten areas of hyperpigmentation of the skin. In this, the activity of the presently disclosed formulations is not merely to exfoliate, i.e., remove off dead skin, but rather to induce a beneficial "wound" so that the skin initiates repair of the wound to heal itself such that collagen, elastin, and other beneficial proteins are produced in comparatively large quantities and benefits such as younger, more elastic skin are obtained.

Inventors similarly believe that, as formulated and delivered herein, the pure and active forms of vitamin A, i.e., all trans-retinol, provide effective topical treatment with a low incidence of irritation, support the skin barrier, and as noted increase cell turnover in the skin, thereby reducing the appearance of fine lines, wrinkles, and age spots, as well as improving skin texture and tone and promoting a collagen-rich appearance, improving patient compliance and the patient's treatment experience.

The inventors believe, without wishing to be held to that belief, that the formulations disclosed herein, formulated for skin peels/micro-peels, among other dermatological procedures, in contrast with daily treatment formulations, provide unexpected results due to use of a retinoid activation system having, for example, ethoxydiglycol and polysorbate 20, in the compositions. Surprisingly, such results have been noted even when the formulations have relatively lower concentrations of active agents, such as retinol. The inventors similarly believe, without wishing to be held to that belief, that it is possible to use comparatively high dosages of ethoxydiglycol in the disclosed formulations, since dosages above 10% are not usual in skincare, without adverse effects, such as irritation, redness, over drying of the skin, due to presence of anti-oxidants, in particular, green-tea polyphenols.

The inventors further believe, without wishing to be held to that belief, that surfactant components of the retinoid activation systems disclosed herein, such as polysorbate, couple with the retinoid component, such as retinol, so that the combination has polarity. The retinoid-surfactant combined with a polar solvent of the retinoid activation systems, as also disclosed herein, results in an aggressive system for driving retinoid/retinol into the skin. In this, although application of the formulations disclosed herein may be combined with treatments for etching the skin, i.e., disrupting the skin's barrier, such as by use of acid, derm-abrasion, laser, before using the disclosed formulations, the inventors believe, without wishing to be held to that belief, that such skin etching pre-treatment procedures are not necessary, although they may be helpful in certain cases.

Antioxidants, particularly green-tea polyphenols, as well as retinol, are generally recognized as notoriously difficult to stabilize, as both are subject to oxidation and/or degradation by oxygen, moisture, light, trace metals, as well as other ingredients frequently included in formulations. This is particularly apparent with respect to topical formulations that present a large surface area when spread on the skin, thereby facilitating air-oxidation of susceptible components of the applied formulation. Surprisingly and unexpectedly, the disclosed formulations overcome these issues, providing unique, stable, non-irritating, and efficacious systems for topical application to the skin.

The disclosed formulations also comprise at least one retinoid source. In one aspect of this embodiment, the retinoid may be retinol, retinoic acid, retinaldehyde, an ester of retinol or of retinoic acid, including e.g., palmitate, acetate, propionate, butyrate, hexanoate, heptanoate, caprylate, and stearate esters of retinol or retinoic acid, or a synthetic retinoid, such as, but not limited to, adapalene, bexarotene, tazarotene, or a combination of two or more, and derivatives thereof. The retinoid or retinol is an oily substance that is solubilized by the formulations disclosed herein. In one aspect of this embodiment, the retinoid is retinol. In another aspect the retinoid is all trans-retinol.

The disclosed formulations also comprise retinoid activation systems having a surfactant and a solvent in varying percentages, whereby the surfactant couples with the retinoid such that the combination has polarity and when combined with a polar solvent provides an aggressive system for driving the retinoid component into the skin's barrier. The inventors believe, without wishing to be held to that belief, that the disclosed retinoid activation systems in combination with a retinoid, such as retinol, provide unexpected, surprising results noted by the inventors.

In certain embodiments of the disclosed formulations, one or more surfactants are formulated with a retinoid. In one aspect of this embodiment, the surfactant is a non-ionic surfactant. In one specific aspect of this embodiment, the surfactant is polysorbate 20. Polysorbate 20 also provides stability to the disclosed formulations.

In certain embodiments of the disclosed formulations, one or more solvents are formulated with a retinoid. In one aspect of this embodiment, the solvent is one or more glycol, alcohol, ether, ethoxylate, propoxylate, poloxamer, or other solvent/modifiers lending polarity or surfactancy. In this, a solvent may be any solution, liquid, neat preparation, or mixture that can disperse the retinoid component, especially once the retinoid is coupled with a surfactant, as previously described herein. The present disclosure contemplates solvents to include, but not limited to, ethoxydiglycol, methoxydiglycol, glycol ethers, propylene glycol, squalane, acetone, propanediol, butylene glycol, hexylene glycol, polyethylene glycol, PEG ethers, PEG/PPG ethers, cetyl glyceryl ether, esters, isopropyl myristate, isopropyl palmitate, hemi-squalane, octyl stearate, among others. In one specific aspect of this embodiment, the solvent/modifier is ethoxydiglycol. Ethoxydiglycol also provides stability and skin penetration to the disclosed formulations.

In other aspects of the disclosed formulations, the compositions include ethoxylates, i.e., compounds formed by an alkoxylation reaction carried out with ethylene oxide. In this, ethoxylates contemplated by the present disclosure include those known in the art to persons of ordinary skill as providing surfactant and/or solvent functionality of the type described herein.

The disclosed formulations may also comprise one or more antioxidants. In one aspect of this embodiment, the antioxidant is a polyphenol. In a more specific aspect of this embodiment, the antioxidant comprises a polyphenol isolate of *Camellia sinensis*. In a further aspect, the polyphenol isolate is 90% polyphenol isolate of *Camellia sinensis*. Other antioxidants contemplated by the present disclosure include, but are not limited to, resveratrol, apigenin, emblica, ectoin, vitamin C and ascorbates, caffeine, individual components of green tea polyphenols, such as epigallocatechin gallate (EGCG), baicalin, ubiquinone, superoxide dismutase, tannins, for example.

In representative embodiments, formulations of the present disclosure comprise ethoxydiglycol, *Camellia sinensis* (green tea) polyphenols, retinol, resveratrol, and polysorbate 20.

In such formulations, ethoxydiglycol and polysorbate 20 are principally responsible for carrying and delivering the co-formulated retinol, although other retinoid activation systems also are contemplated as previously discussed herein. In some embodiments, the green tea polyphenols and resveratrol reduce the potential for irritation.

The antioxidant included in the disclosed retinoid formulations may include *Camellia sinensis* (green tea) polyphenols. In particular embodiments a purified isolate of *Camellia sinensis* (green tea) polyphenols is included in the formulations. Although, in various embodiments, any *Camellia sinensis* (green tea) preparation of polyphenols may be formulated, in specific aspects of this embodiment, a 90% purified preparation of *Camellia sinensis* (green tea) polyphenols is formulated. In various other formulations, the amount of polyphenol antioxidant added is inversely related to the purity thereof.

The antioxidant included in the disclosed retinoid formulations may include *Camellia sinensis* (green tea) polyphenols which may be a mixture of polyphenol species. In specific aspects, the major component of the formulated polyphenol antioxidant is epigallocatechin gallate (EGCG).

The present inventors have noted that green tea polyphenols in the formulations provide not only potent antioxidant reduction of reactive oxygen species (ROS) but they also provided, very surprisingly, a reduction in the irritation normally associated with intense retinol use. This observed reduction in irritation was dramatically better than other antioxidants and anti-irritants. Inclusion of these materials in the disclosed formulations boosts patient compliance.

Inventors believe, without wishing to be held to that belief, that the retinoid activation and antioxidant components of the disclosed formulations, particularly the formulated, therapeutic levels of ethoxydiglycol and green tea polyphenols interact synergistically with the formulated retinoid, specifically the all trans-retinol, to provide effective skin peels, i.e., the skin peels more deeply than prior skin peel compositions, so that effective, improved exfoliation and peeling of the skin in relatively large flakes is achieved without associated skin irritation and/or redness and/or dryness. Inventors similarly believe that the formulated levels of green tea polyphenols and resveratrol soothe and calm the skin, reducing irritation and help to reduce, alleviate, ameliorate, or eliminate the appearance of redness of the skin to which the retinoid-containing formulations have been applied.

Inventors also believe, without wishing to be held to that belief, that the systems disclosed herein work differently from other topical treatments, delivering, i.e., driving, up to 100% of the formulated retinol into the skin.

In one embodiment of the present disclosure, the retinoid containing formulations include the following components: ethoxydiglycol, *Camellia sinensis* green tea polyphenols, retinol, resveratrol, and polysorbate 20.

The *Camellia sinensis* green tea polyphenols is, preferably, used as a 90% pure preparation and the retinol is preferably all trans-retinol, and more preferably the retinol is preferably at least 90% pure all trans-retinol, and even more preferably, the retinol is preferably at least 95% pure all trans-retinol, or a preparation containing a concentrate of all-trans retinol in a solubilizer, for example, 50% retinol in polysorbate 20.

In other embodiments of the present disclosure, the retinoid containing formulations include the following components formulated within the indicated ranges (all expressed as % amount per gram): ethoxydiglycol (1%-98%), *Camellia sinensis* green tea polyphenols (0.1%-10%), retinol (>1%-98%), resveratrol (0.1%-10%), and polysorbate 20 (0.1%-98%).

The *Camellia sinensis* green tea polyphenols is, preferably, used as a 90% pure preparation and the retinol is preferably all trans-retinol, and more preferably the retinol is preferably at least 90% pure all trans-retinol, and even more preferably, the retinol is preferably at least 95% pure all trans-retinol.

In certain embodiments of the present disclosure, the retinoid containing formulation includes the following components formulated within the indicated ranges (all expressed as % w/w): ethoxydiglycol (5%-93%), *Camellia sinensis* green tea polyphenols (0.1%-20%), retinol (2%-50%), resveratrol (0.1%-10%), and polysorbate 20 (2%-98%).

The *Camellia sinensis* (green tea) polyphenols is, preferably, used as a 90% pure preparation and the retinol is preferably all trans-retinol, and more preferably the retinol is preferably at least 90% pure all trans-retinol, and even more preferably, the retinol is preferably at least 95% pure all trans-retinol.

In still further embodiments, the all trans-retinol of the above described formulations can be substituted with, or supplemented by, one or more of the following retinoids: retinaldehyde, esters of retinol, retinoic acid, synthetic retinoids, e.g., adapalene, tazarotene, for example.

Formulations and delivery systems of the present disclosure may be prepared under ambient conditions. In certain embodiments, formulations and delivery systems of the present disclosure are prepared under an inert atmosphere. In particular aspect of this embodiment, the inert atmosphere is an inert gas, such as, but not limited to, nitrogen, argon, or combinations thereof. In certain embodiments, formulations of the present disclosure are prepared under a dry inert atmosphere, which may comprise, consist essentially of, or consist of one or more dry inert gases, including, but not limited to, dry nitrogen, dry argon, or a combination thereof.

Exemplary Compositions (all expressed as % w/w)

| Ingredient | % w/w | % w/w |
|---|---|---|
| Ethoxydiglycol | 5%-93% | 84.17% |
| Camellia Sinensis Leaf Extract 90% | 0.1%-20% | 2.00% |
| Resveratol 85-99% | 0.1%-10% | 0.50% |
| Retinol 50c | 2%-98% | 13.33% |
| Polysorbate 20 Retinol | | |

What is claimed is:

1. A topical formulation for skincare treatments, comprising: a retinoid comprising retinol, wherein the retinoid does not include retinaldehyde;
   a retinoid activation system comprising a surfactant and a solvent; and an anti-inflammatory agent,
   wherein (% w/w) the retinoid is at least 5%, the retinoid activation system comprises at least 2% of a surfactant and at least 10% of a solvent, the anti-inflammatory agent is at least 0.1%,
   wherein the anti-inflammatory agent comprises *Camellia sinensis* green tea polyphenols,
   wherein the solvent comprises ethoxydiglycol, and
   wherein the topical formulation does not include water.

2. The formulation of claim 1, wherein the retinol is all trans-retinol.

3. The formulation of claim 1, wherein the surfactant is polysorbate 20.

4. The formulation of claim 1, wherein the formulation includes at least 0.01% of *Camellia sinensis* green tea polyphenols and at least 0.01% of resveratrol.

5. The formulation of claim 1, comprising (% w/w):
   2%-98% retinoid activation system;
   0.1%-20% *Camellia sinensis* green tea polyphenols;
   5%-50% retinol;
   0.1%-10% resveratrol.

6. The formulation of claim 5, wherein the *Camellia sinensis* green tea polyphenols is a 90% pure preparation and wherein the retinol is all trans-retinol.

7. The formulation of claim 6, wherein the all trans-retinol is at least 90% pure all trans-retinol.

8. The formulation of claim 7, wherein the all trans-retinal is at least 95% pure all trans-retinol.

9. The formulation of claim 1, comprising (% w/w):
   84.17% ethoxydiglycol;
   2.00% *Camellia sinensis* green tea polyphenols;
   4.0% retinol;
   0.50% resveratrol;
   5.33% polysorbate 20.

10. A method of skin treatment for modulated exfoliation of skin without inflammatory response, comprising:
    applying to a skin area an effective amount of a formulation comprising: a retinoid comprising retinol, wherein the retinoid does not include retinaldehyde;
    a retinoid activation system comprising a surfactant and a solvent; and an anti-inflammatory agent,
    wherein (% w/w) the retinoid is at least 5%, the retinoid activation system comprises at least 2% of a surfactant and at least 10% of a solvent, the anti-inflammatory agent is at least 0.1%;
    wherein the anti-inflammatory agent comprises *Camellia sinensis* green tea polyphenols;
    wherein the solvent comprises ethoxydiglycol, and wherein the formulation does not include water; and
    the skin is exfoliated in sheet-peeling without inflammatory response that retards healing.

11. The method of claim 10, wherein the skin treatment includes peeling, chemexfoliation, dermal restructuring.

12. The method of claim 10, wherein the retinol is all trans-retinol.

13. The method of claim 10, wherein the surfactant is polysorbate 20.

14. The method of claim 10, wherein the formulation comprises (% w/w):
    84.17% ethoxydiglycol;
    2.00% *Camellia sinensis* green tea polyphenols;
    4.0% retinol;
    0.50% resveratrol;
    5.33% polysorbate 20.

* * * * *